Dec. 28, 1965  G. NEESE  3,226,170
THRUST BEARING AND METHOD OF MAKING SAME
Filed Oct. 11, 1963
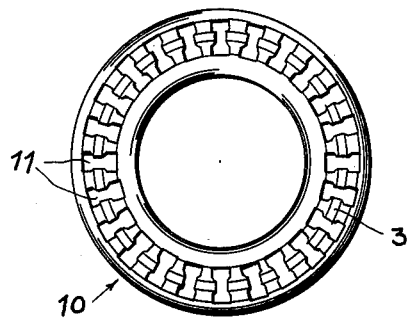
Fig.1
Fig.1a
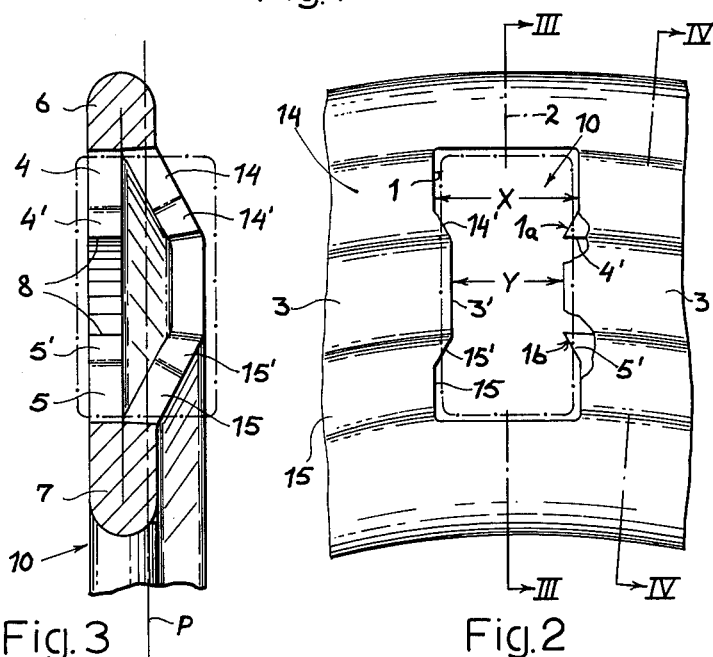
Fig.3   Fig.2   Fig.4
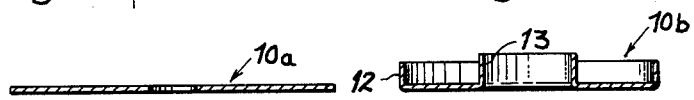
Fig.5a   Fig.5b   Fig.5c
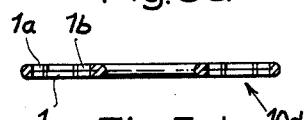
Fig.5d
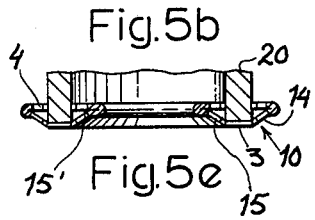
Fig.5e
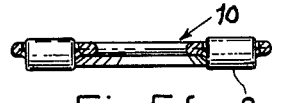
Fig.5f
INVENTOR.
GERHARD NEESE
BY Karl F. Ross
AGENT United States Patent Office 3,226,170
Patented Dec. 28, 1965

3,226,170
THRUST BEARING AND METHOD OF
MAKING SAME
Gerhard Neese, Grossdornberg uber Bielefeld, Germany,
assignor to Durkoppwerke Aktiengesellschaft, Bielefeld,
Germany, a corporation of Germany
Filed Oct. 11, 1963, Ser. No. 315,657
9 Claims. (Cl. 308—235)

My present invention relates to a thrust bearing of the type in which a cage of annular configuration is provided with an array of angularly spaced, radially extending slots accommodating a set of needles or other roller-shaped bearing elements.

The general object of this invention is to provide a roller cage of this character which is of compact construction and can be easily mass-produced from sheet steel or other suitable sheet material.

A more particular object of my invention is to provide a cage of small axial dimension, made in one piece so as to avoid any possibility of relative displacement of its roller-guiding surfaces, and adapted to hold the rollers securely in place with a minimum of friction.

It is also an object of the instant invention to provide a cage of this description which affords easy access to all roller-guiding surfaces so as to facilitate their lubrication.

A further object of the invention is to provide a process for producing such a cage from a piece of sheet material by a series of simple steps.

In accordance with the present invention I provide a toroidal ring-shaped body with a generally trapezoidal profile, the major base of the trapezoid being split by a circular gap formed by the confronting peripheries of a pair of bent-over flange portions, the minor base and the sides of the trapezoid being defined by a flat central portion and a pair of inclined intermediate portions, respectively; all these portions, including the two concentric flanges separated by the circular gap, are annular in shape and integral with one another. This body is pierced by the roller-receiving slots in such manner that generally rectangular windows are formed in the interconnected central and intermediate portions, which constitute the minor base and the sides of the profile, while facing cutouts are produced in the concentric flange portions, these cutouts registering with respective parts of the corresponding windows and terminating each in a pair of converging edges which engage the associated roller at one side of the common plane of all the roller axes; at the other side of that plane the roller is engaged by a pair of parallel edges which bound a restricted mid-portion of the corresponding window, this midportion having a width less than the roller diameter and being located in the central annular portion of the cage body, thus along the minor base of the trapezoid. Advantageously, the gap separating the two flange portions is of substantially the same width as the aforementioned central portion, in order to facilitate the introduction of a ring-shaped tool serving to space the minor base of the trapezoid from its major base by a distance less than the roller diameter.

The invention will be better understood from the following detailed description, reference being made to the accompanying drawing in which:

FIG. 1 is a face view of a roller cage representing a preferred embodiment;

FIG. 1a is a side view of the cage seen in FIG. 1;

FIG. 2 is a fragmentary view of the cage bodies of FIGS. 1 and 1a, in face view and drawn to a larger scale;

FIGS. 3 and 4 are sectional views respectively taken on the lines III—III and IV—IV of FIG. 2, showing the generally trapezoidal profile; and FIGS. 5a–5f illustrate, in axial section, the successive steps of shaping a flat disk of sheet metal into the cage of FIGS. 1 and 1a in accordance with my invention.

The cage 10 shown in FIGS. 1 and 1a is in the form of a toroidal annular body provided with an array of radial slots 11, these slots being generally rectangular but slightly constricted in the middle. As best seen in FIGS. 3 and 4, body 10 has a generally trapezoidal profile of a depth less than the diameter of a set of rollers or needles 2 to be accommodated thereby. Body 10 comprises a flat central annular portion 3, defining the minor base of the trapezoid, joined at an obtuse angle by two intermediate annular portions 14 and 15 bent over at 6 and 7 to form flange portions 4 and 5. The flanges 4, 5 are disposed in a common plane, parallel to that of portion 3, and are separated by a circular gap 8 whose width substantially equals that of portion 3 aligned therewith.

The slots 11, substantially conforming to the outline of the needles 2, manifest themselves as windows 1 in the main body part 3, 14, 15 and as facing cutouts 1a, 1b (FIG. 2) in the flange portions 4 and 5 thereof. These cutouts are, of course, coextensive with respective parts of the corresponding window 1, i.e. with those parts that are located on the sloping portions 14 and 15. The sloping portions 14, 15 form converging edges 14' and 15' leading to a constricted midsection of the window in the region of annular portion 3; as indicated in FIG. 2, the width x of window 1 and cutouts 1a, 1b in the region of body portions 14, 15 and 4, 5, respectively, is slightly greater than the diameter of needle 2 whereas the width y of the narrower midsection of window 1 is somewhat less than that diameter. This midsection thus forms a pair of lateral edges 3' which are parallel to the generatrices of the cylindrical needle 2 and bear upon it at locations offset from the common axial plane P of the needles (FIG. 3) without exerting any clamping pressure thereon. The cutouts 1a, 1b terminate in pairs of converging edges 4', 5' (FIG. 2) which register with the edges 14', 15' of window 1 and contact the needle 2 at the opposite side of plane P to hold it in place within the slot 11. It will thus be seen that each needle 2 is rotatably mounted, with a minimum of friction, within its slot 11 so as to project slightly beyond the zones 3 and 4, 5 of the toroidal body, i.e. beyond the minor and major bases of the trapezoid, being retained in the slot by contact with the edges 3', 4' and 5' only.

As will be further seen from FIG. 3, the thickness of the sheet constituting the body 10 corresponds to substantially one-fourth the needle diameter.

Reference will now be made to FIGS. 5a–5f for a description of the process for making the needle cage 10. A flat annular sheet-metal disk 10a, FIG. 5a, is deformed by suitable tools into a structure 10b, FIG. 5b, having the outer and inner peripheral disk portions bent over to form axially extending flanges 12 and 13. These flanges are subsequently flattened against the main disk body to constitute the portions 4 and 5, as shown in FIG. 5c, thereby forming the two-layer disk structure 10c: it will be noted that the two flanges, separated by the annular gap 8, need not be necessarily of the same width. Next, as illustrated in FIG. 5d, the structure 10d is obtained as the disk of FIG. 5c is penetrated by a suitable punching tool, not shown, to produce the windows 1 and the cutouts 1a, 1b registering therewith. Finally, as illustrated in FIG. 5e, the body 10 is given its ultimate shape with the aid of an annular tool 20 which traverses the gap 8 to separate the main disk portion from its flanges 4 and 5, thereby establishing the trapezoidal profile of the toroidal body with its minor base 3 and its sides 14, 15. Upon the withdrawal of tool 20, the needless 2 are inserted through the resiliently yieldable crenellations of flange portions 4 and 5 which separate their respective cutouts 1a and 1b from one another; this has been illustrated in FIG. 5f.

My invention is, of course, not limited to the exact structural details herein disclosed but may be modified in various respects without departing from the spirit and scope of the appended claims.

I claim:
1. A roller cage for a thrust bearing, comprising a ring-shaped body of sheet material composed of integrally connected annular portions including:
   a pair of concentric flange portions disposed in a first plane transverse to the axis of said body;
   a flat central portion disposed in a second transverse plane spaced from said first plane by a distance less than the diameter of a roller of a set of rollers to be accommodated by the cage, said central portion having a width less than the length of said rollers;
   a first intermediate portion extending inclinedly between said planes and interconnecting the inner peripheries of said central portion and of the inner one of said concentric flange portions;
   and a second intermediate portion extending inclinedly between said planes and interconnecting the outer peripheries of said central portion and of the outer one of said concentric flange portions, thereby defining a generally trapezoidal profile for said body;
   said body being provided with an array of angularly spaced radial slots forming windows of generally rectangular configuration in said central and intermediate portions, said windows conforming substantially to the outline of said rollers, and further forming cutouts in said flange portions registering with respective parts of said windows in said intermediate portions, said windows being constricted at said central portion so as to have a width less than the roller diameter, each of said cutouts terminating in a pair of converging roller-engaging edges co-operating with the lateral boundaries of the constricted window part for holding a respective roller in place.

2. A roller cage as defined in claim 1 wherein said flange portions are separated from each other by an annular gap having a width substantially equal to that of said central portion.

3. A roller cage for a thrust bearing comprising a toroidal annular body of sheet material with a generally trapezoidal profile, said body being split by a circular gap substantially midway along the major base of the trapezoid, the height of the trapezoid being less than the diameter of a roller of a set of rollers to be accommodated by the cage, the minor and the major base of the trapezoid being respectively shorter and longer than said rollers, said body being provided with an array of angularly spaced radial slots forming windows of generally rectangular configuration which extend over the minor base and at least part of the sides of the trapezoid, said windows conforming substantially to the outline of said rollers, and further forming cutouts coextensive with respective parts of said windows at said major base on opposite sides of said gap, said windows having a constricted part at said minor base bounded by parallel roller-engaging sides separated by less than the diameter of said rollers, each of said cutouts terminating in a pair of converging roller-engaging edges adjoining said gap.

4. A roller cage as defined in claim 3 wherein said gap has a width substantially equal to the length of said minor base.

5. A thrust bearing comprising a set of rollers and a ring-shaped body of sheet material composed of integrally connected annular portions including:
   a pair of concentric flange portions disposed in a first plane transverse to the axis of said body;
   a flat central portion disposed in a second transverse plane spaced from said first plane by a distance less than the diameter of a roller of said set of rollers, said central portion having a width less than the length of said rollers;
   a first intermediate portion extending inclinedly between said planes and interconnecting the inner peripheriesof said central portion and of the inner one of said concentric flange portions;
   and a second intermediate portion extending inclinedly between said planes and interconnecting the outer peripheries of said central portion and of the outer one of said concentric flange portions, thereby defining a generally trapezoidal profile for said body;
   said body being provided with an array of angularly spaced radial slots forming windows of generally rectangular configuration in said central and intermediate portions, said windows conforming substantially to the outline of said rollers, and further forming cutouts in said flange portions registering with respective parts of said windows in said intermediate portions, said windows being constricted at said central portion so as to have a width less than the roller diameter, each of said cutouts terminating in a pair of converging roller-engaging edges co-operating with the lateral boundaries of the constricted window part for holding a respective roller in place, said rollers being rotatably held in said slots with their axes between said first and second planes.

6. A thrust bearing as defined in claim 5 wherein said flange portions are separated from each other by an annular gap having a width substantially equal to that of said central portion.

7. A thrust bearing comprising a set of rollers and a toroidal annular body of sheet material with a generally trapezoidal profile; said body being split by a circular gap substantially midway along the major base of the trapezoid, the height of the trapezoid being less than the diameter of a roller of said set of rollers, the minor and the major base of the trapezoid being respectively shorter and longer than said rollers, said body being provided with an array of angularly spaced radial slots forming windows of generally rectangular configuration which extend over the minor base and at least part of the sides of the trapezoid, said windows conforming substantially to the outline of said rollers, and further forming cutouts coextensive with respective parts of said windows at said major base on opposite sides of said gap, said window having a constricted part of said minor base bounded by parallel roller-engaging sides separated by less than the diameter of said rollers, each of said cutouts terminating in a pair of converging roller-engaging edges adjoining said gap, said rollers being rotatably held in said slots with their axes between the planes of said major and minor bases.

8. A thrust bearing as defined in claim 7 wherein said gap has a width substantially equal to the length of said minor base.

9. A thrust bearing as defined in claim 7 wherein said body consists of sheet metal having a thickness substantially equal to one-fourth of the roller diameter.

References Cited by the Examiner

UNITED STATES PATENTS

| 2,848,791 | 8/1958 | Neese | 29—148.4 |
| 3,091,500 | 5/1963 | Altson | 308—217 |
| 3,110,529 | 11/1963 | Schaeffler | 308—217 |
| 3,114,960 | 12/1963 | Einaudi | 29—148.4 |

DON A. WAITE, *Primary Examiner.*

ROBERT C. RIORDON, *Examiner.*